United States Patent
Seo et al.

(10) Patent No.: US 11,955,859 B2
(45) Date of Patent: Apr. 9, 2024

(54) BUSBAR UNIT FOR MOTOR

(71) Applicant: HYUNDAI MOBIS CO., LTD., Seoul (KR)

(72) Inventors: Yeong Woo Seo, Yongin-si (KR); Jong Bin Park, Yongin-si (KR); Jung Kyu Yim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 731 days.

(21) Appl. No.: 17/101,619

(22) Filed: Nov. 23, 2020

(65) Prior Publication Data

US 2022/0029493 A1 Jan. 27, 2022

(30) Foreign Application Priority Data

Jul. 21, 2020 (KR) ........................ 10-2020-0089947

(51) Int. Cl.
*H02K 3/50* (2006.01)

(52) U.S. Cl.
CPC ........... *H02K 3/50* (2013.01); *H02K 2203/09* (2013.01)

(58) Field of Classification Search
CPC ..................................................... H02K 3/50
USPC ........................................................ 310/71
See application file for complete search history.

(56) References Cited

U.S. PATENT DOCUMENTS

| | | | | |
|---|---|---|---|---|
| 9,024,490 B2 * | 5/2015 | Fujisaki | ................ | H02K 3/522 310/71 |
| 11,043,881 B2 * | 6/2021 | Eguchi | .................. | H02K 11/30 |
| 11,245,302 B2 * | 2/2022 | Homma | ................. | H02K 11/33 |
| 11,258,330 B2 * | 2/2022 | Ueno | ...................... | H02K 7/083 |
| 2015/0008775 A1 * | 1/2015 | Arai | ........................ | H02K 3/28 310/71 |
| 2020/0195083 A1 * | 6/2020 | Ueno | ...................... | H02K 7/083 |
| 2021/0029843 A1 * | 1/2021 | Ueno | .................. | H02K 5/1732 |
| 2022/0140686 A1 * | 5/2022 | Hirai | ..................... | H02K 3/521 310/71 |

FOREIGN PATENT DOCUMENTS

| | | |
|---|---|---|
| JP | 2012-130203 A | 7/2012 |
| JP | 2012-143019 A | 7/2012 |
| JP | 2012-231573 A | 11/2012 |
| JP | 2013-42633 A | 2/2013 |
| JP | 5661161 B1 | 1/2015 |
| JP | 2017-85756 A | 5/2017 |

(Continued)

OTHER PUBLICATIONS

Korean Office Action dated May 12, 2022, in the corresponding Korean Patent Application No. 10-2020-0089947 (5 Pages in Korean).

*Primary Examiner* — Alexander Talpalatski
(74) *Attorney, Agent, or Firm* — NSIP Law

(57) ABSTRACT

The present disclosure relates to a busbar unit for a motor, the busbar unit including: a first terminal; a second terminal provided to be spaced apart from the first terminal in a first direction; a third terminal stacked on the first terminal in a second direction perpendicular to the first direction; a fourth terminal stacked on the second terminal in the second direction; and a holder configured to support the first terminal, the second terminal, the third terminal, and the fourth terminal, thereby obtaining an advantageous effect of simplifying a structure and improving a degree of design freedom and spatial utilization.

14 Claims, 16 Drawing Sheets

(56) References Cited

FOREIGN PATENT DOCUMENTS

| KR | 10-2015-0080400 | A | 7/2015 |
| KR | 10-1900502 | B1 | 9/2018 |
| KR | 10-2019-0024128 | A | 3/2019 |

\* cited by examiner

BUSBAR UNIT FOR MOTOR

CROSS-REFERENCE TO RELATED APPLICATION

This application claims priority to and the benefit of Korean Patent Application No. 10-2020-0089947 filed in the Korean Intellectual Property Office on Jul. 21, 2020, the entire contents of which are incorporated herein by reference.

TECHNICAL FIELD

The present disclosure relates to a busbar unit for a motor, and more particularly, to a busbar unit for a motor, which may have a simplified structure and improve a degree of design freedom and spatial utilization.

BACKGROUND ART

A hybrid vehicle or an electric vehicle, which is called an environmentally-friendly vehicle, generates driving power by using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes a stator core formed by stacking electrical steel sheets, and a stator coil wound around the stator core.

A busbar is provided at an upper side of the stator, and the stator coil is connected to an external power source through the busbar.

The busbar is structured to include a plurality of terminals inside a ring-shaped holder, and the terminals are provided by a combination of three phase terminals connected to U-phase, V-phase, and W-phase power sources, and a neutral terminal that connects the phase terminals.

Meanwhile, the busbar is disposed at the upper side of the stator in an axial direction of the stator, and an overall height of the motor (a height in the axial direction of the stator) is increased as a thickness of the busbar (a thickness in the axial direction of the stator) is increased. As a result, the thickness of the busbar needs to be minimized in order to miniaturize the motor.

However, because the four terminals (the U-phase terminal, the V-phase terminal, the W-phase terminal, and the neutral terminal), which constitute the busbar, are stacked in a vertical direction in the related art, there is a limitation in decreasing an overall height (a vertical thickness) of the busbar. Further, because a space (a height) for disposing the busbar needs to be ensured at the upper side of the stator even though the thickness of the busbar is decreased, there is a problem in that it is difficult to decrease the overall height of the motor.

Moreover, in the related art, an overmolded layer for electrical insulation needs to be individually formed on each of the four terminals (the overmolded layer needs to be formed to surround each of the terminals), and an overmolded housing needs to be additionally formed to surround the entire circumferences of the plurality of overmolded layers stacked in the vertical direction. As a result, there is a problem in that the manufacturing process is complicated and cumbersome.

In addition, in order to ensure a creeping distance for implementing the electrical insulation between the respective terminals, a predetermined thickness or more of the overmolded layer needs to be ensured However, since an overall height of the busbar is increased as a thickness of the overmolded layer is increased, there is a problem in that it is difficult to ensure a sufficient thickness of the overmolded layer.

Therefore, recently, various types of research are conducted to simplify and miniaturize a structure of the busbar, but the research result is still insufficient. Accordingly, there is a need for development of a busbar having a simplified and miniaturized structure.

SUMMARY OF THE INVENTION

An object of the present disclosure is to provide a busbar unit for a motor, which may have a simplified structure and improve a degree of design freedom and spatial utilization.

Another object of the present disclosure is to minimize a thickness of a busbar unit and contribute to the miniaturization of a motor.

Still another object of the present disclosure is to simplify a manufacturing process and reduce manufacturing time.

Yet another object of the present disclosure is to improve electrical insulation performance and improve stability and reliability.

The object to be achieved by the exemplary embodiment is not limited to the above-mentioned objects, but also includes objects or effects that may be recognized from the solutions or the exemplary embodiments described below.

In order to achieve the above-mentioned objects of the present disclosure, an exemplary embodiment of the present disclosure provides a busbar unit for a motor, the busbar unit including: a first terminal; a second terminal provided to be spaced apart from the first terminal in a first direction; a third terminal stacked on the first terminal in a second direction perpendicular to the first direction; a fourth terminal stacked on the second terminal in the second direction; and a holder configured to support the first terminal, the second terminal, the third terminal, and the fourth terminal.

This is to simplify a structure of the busbar unit and improve a degree of design freedom and spatial utilization.

That is, the busbar is disposed at an upper side (or a lower side) of a stator in an axial direction of the stator, and an overall height of a motor (a height in the axial direction of the stator) is increased as a thickness of the busbar (a thickness in the axial direction of the stator) is increased. As a result, the thickness of the busbar needs to be minimized in order to miniaturize the motor.

However, because a plurality of terminals (a U-phase terminal, a V-phase terminal, a W-phase terminal, and a neutral terminal), which constitute the busbar, are stacked in a vertical direction in the related art, there is a limitation in decreasing an overall height (a vertical thickness) of the busbar. Further, because a space (a height) for disposing the busbar needs to be ensured at the upper side of the stator even though the thickness of the busbar is decreased, there is a problem in that it is difficult to decrease the overall height of the motor.

However, according to the exemplary embodiment of the present disclosure, the first terminal and the second terminal are arranged in the first direction, and the third terminal and the fourth terminal are arranged on the first terminal and the second terminal in the second direction perpendicular to the first direction. In other words, the first to fourth terminals are arranged in a 2×2 matrix. As a result, it is possible to minimize a thickness of the busbar unit.

Therefore, it is possible to obtain an advantageous effect of improving spatial utilization in a region above the stator, improving a degree of design freedom, minimizing an increase in size of the motor caused by mounting the busbar unit for implementing a control circuit for the motor, and thus contributing to the miniaturization of the motor.

The first terminal, the second terminal, the third terminal, and the fourth terminal may have various structures in accordance with required conditions and design specifications.

According to the exemplary embodiment of the present disclosure, the first terminal may include: a first body; and a first terminal part extending from the first body and exposed from an upper surface of the holder, the second terminal may include: a second body; and a second terminal part extending from the second body and exposed from the upper surface of the holder, the third terminal may include: a third body; and a third terminal part extending from the third body and exposed from the upper surface of the holder, and the fourth terminal may include: a fourth body; and a fourth terminal part extending from the fourth body and exposed from the upper surface of the holder.

The structure of the holder may be variously changed in accordance with required conditions and design specifications.

According to the exemplary embodiment of the present disclosure, the holder may include: an overmolded layer formed to surround the first terminal and the second terminal; and an overmolded housing formed to surround the overmolded layer, the third terminal, and the fourth terminal.

As described above, in the exemplary embodiment of the present disclosure, since only the single overmolded layer and the single overmolded housing constitute the holder, it is possible to obtain an advantageous effect of simplifying the structure of the holder, simplifying a process of manufacturing the holder, and reducing manufacturing time.

That is, in the related art, an overmolded layer for electrical insulation needs to be individually formed on each of the four terminals (the overmolded layer needs to be formed to surround each of the terminals), and an overmolded housing needs to be additionally formed to surround the entire circumferences of the plurality of overmolded layers stacked in the vertical direction. As a result, there is a problem in that the manufacturing process is complicated and cumbersome. Moreover, in the related art, since an overall height of the busbar is increased as a thickness of the overmolded layer is increased, there is a problem in that it is difficult to ensure a sufficient thickness of the overmolded layer.

However, according to the exemplary embodiment of the present disclosure, the holder may be formed only by the two injection molding processes (the process of injection-molding the overmolded layer and the process of injection-molding the overmolded housing), and as a result, it is possible to obtain an advantageous effect of ensuring electrical insulation performance, simplifying the structure of the holder, and simplifying the process of manufacturing the holder.

According to the exemplary embodiment of the present disclosure, the busbar unit for a motor may include a spacer interposed between the first and second terminals and the third and fourth terminals.

As described above, since the spacer is interposed between the first and second terminals arranged in a first layer and the third and fourth terminals arranged in a second layer, a sufficient spacing interval may be ensured between the first terminal and the third terminal, and a sufficient spacing interval may be ensured between the second terminal and the fourth terminal, such that electrical insulation performance between the first terminal and the third terminal and electrical insulation performance between the second terminal and the fourth terminal may be ensured. Therefore, it is possible to obtain an advantageous effect of minimizing a defect of insulation between the first terminal and the third terminal (between the second terminal and the fourth terminal) and improving stability and reliability.

In particular, the spacer may be interposed between the overmolded layer and the third and fourth terminals.

According to the exemplary embodiment of the present disclosure, the busbar unit for a motor may include: guide protrusions formed on the spacer; and guide grooves formed in the overmolded layer to receive the guide protrusions.

As described above, when the spacer is seated on the overmolded layer, the guide protrusion is received (inserted) into the guide groove, and as a result, it is possible to obtain an advantageous effect of preventing the spacer from rotating and moving with respect to the overmolded layer and stably maintaining the state in which the spacer is disposed.

In addition, since the guide protrusion is formed on the spacer and the guide groove is formed in the overmolded layer, the spacer may be seated on (in close contact with) the upper portion of the overmolded layer only in a state in which the spacer is aligned (in the vertical direction) at an exact position with the overmolded layer, such that it is possible to improve accuracy in assembling the spacer and easily recognize whether the spacer is erroneously assembled.

In particular, the guide protrusions may include: a first guide protrusion formed adjacent to an inner circumferential surface of the spacer, and a second guide protrusion spaced apart from the first guide protrusion in a circumferential direction of the spacer and formed adjacent to an outer circumferential surface of the spacer, and the guide grooves may include: a first guide groove configured to receive the first guide protrusion; and a second guide groove configured to receive the second guide protrusion.

According to the exemplary embodiment of the present disclosure, the spacer may have passing holes through which the first terminal part and the second terminal part pass.

According to the exemplary embodiment of the present disclosure, the spacer may include: a first seating portion on which the third terminal is seated; and a second seating portion on which the fourth terminal is seated.

As described above, since the spacer has the first seating portion and the second seating portion, it is possible to obtain an advantageous effect of stably maintaining the state in which the third terminal and the fourth terminal are seated.

In particular, the first seating portion and the second seating portion may be recessed in an upper surface of the spacer.

According to the exemplary embodiment of the present disclosure, a boundary rib may be provided between the first seating portion and the second seating portion. As described above, since the boundary rib is formed along the boundary between the first seating portion and the second seating portion, it is possible to obtain an advantageous effect of more stably maintaining the state in which the third and fourth terminals are seated on the first and second seating portions and ensuring electrical insulation performance between the third terminal and the fourth terminal.

According to the exemplary embodiment of the present disclosure, the busbar unit for a motor may include a coil support unit provided on an upper portion of the holder and configured to support a coil of a stator.

As an example, the coil support unit may have a coil receiving groove that receives the coil.

DETAILED DESCRIPTION

Figure 1:
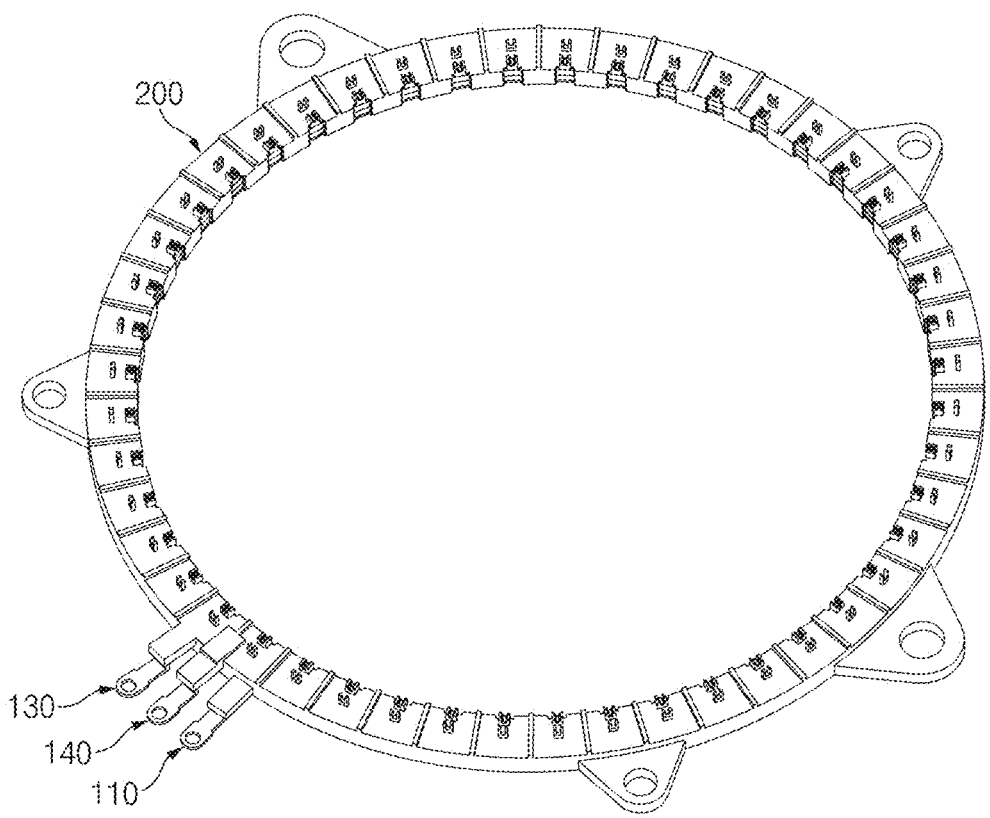
FIG. 1 is a perspective view illustrating a busbar unit for a motor according to an exemplary embodiment of the present disclosure.
Figure 2:
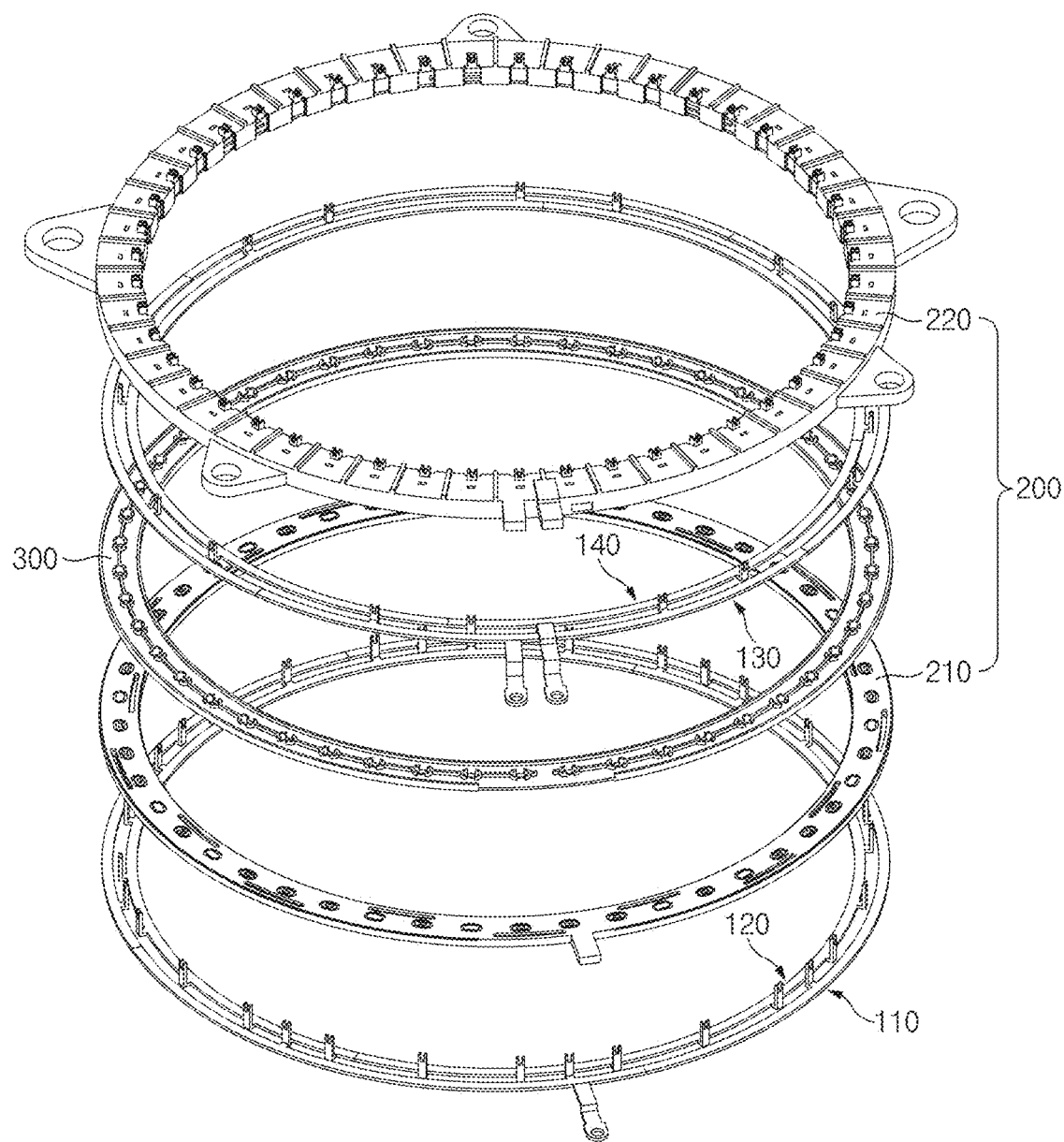
FIG. 2 is an exploded perspective view for explaining the busbar unit for a motor according to the exemplary embodiment of the present disclosure.
Figure 3:
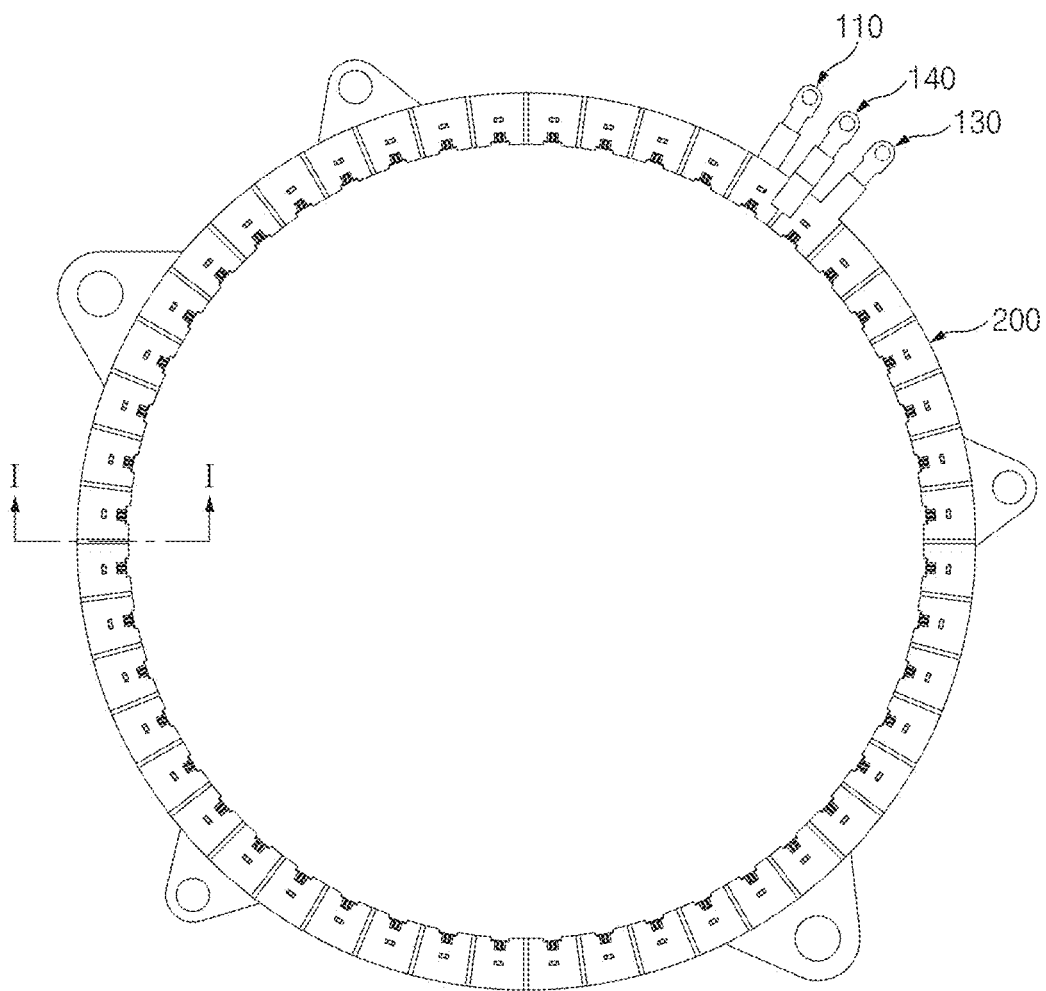
FIG. 3 is a top plan view illustrating the busbar unit for a motor according to the exemplary embodiment of the present disclosure.

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 16, a busbar unit 10 for a motor according to an exemplary embodiment of the present disclosure includes: a first terminal 110; a second terminal 120 provided to be spaced apart from the first terminal 110 in a first direction; a third terminal 130 stacked on the first terminal 110 in a second direction perpendicular to the first direction; a fourth terminal 140 stacked on the second terminal 120 in the second direction; and a holder 200 configured to support the first terminal 110, the second terminal 120, the third terminal 130, and the fourth terminal 140.

For reference, the busbar unit 10 for a motor according to the exemplary embodiment of the present disclosure may be mounted on various types of motors in accordance with required conditions and design specifications, and the present disclosure is not restricted or limited by the type and the structure of the motor.

As an example, the motor, to which the busbar unit 10 according to the exemplary embodiment of the present disclosure is applied, may be used as a drive motor for an environmentally-friendly vehicle, such as a hybrid vehicle and/or an electric vehicle, which obtains driving power from electrical energy.

For example, the drive motor is an inner-rotor-type synchronous motor and includes a stator (not illustrated) installed in a motor housing (not illustrated), and a rotor (not illustrated) rotatably installed in the stator with a predetermined air gap from the stator. The busbar unit 10 according to the exemplary embodiment of the present disclosure may be connected to the stator.

The stator may be received in the housing (not illustrated), and a coil 60 configured to induce an electrical interaction between the stator and the rotor is wound around the stator.

As an example, the stator includes a plurality of split cores (not illustrated) provided to cooperatively define a ring shape, and a support ring (not illustrated) provided to surround outer circumferential surfaces of the plurality of split cores.

The split core may be variously changed in number and structure in accordance with required conditions and design specifications, and the present disclosure is not restricted or limited by the number of split cores and the structure of the split core.

More specifically, the split core may be formed by stacking a plurality of electrical steel sheets in an axial direction of the rotor.

A bobbin (not illustrated) (made of plastic, for example) is provided around the respective split cores, and a coil (see 60 in FIG. 15) is wound around the bobbin.

According to another exemplary embodiment of the present disclosure, the stator may be configured by only one core.

The rotor is provided to be rotated by the electrical interaction between the stator and the rotor.

As an example, the rotor may include a rotor core (not illustrated) and magnets (not illustrated). The rotor core may be structured by stacking a plurality of circular plates in the form of a thin steel sheet or structured in the form of a bin.

A hole (not illustrated), to which a shaft is coupled, may be formed at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets to prevent the deviation of the magnets.

The busbar unit 10 may be disposed at an upper side of the stator and may include the first to fourth terminals 110, 120, 130, and 140 and the holder 200.

The first to fourth terminals 110, 120, 130, and 140 are provided to electrically connect the coil 60 of the stator and an external power source.

Referring to FIGS. 5 to 8, each of the first to fourth terminals 110, 120, 130, and 140 may be at least one of phase terminals (a U-phase terminal, a V-phase terminal, and a W-phase terminal) connected to U-phase, V-phase, and W-phase power sources and a neutral terminal configured to electrically connect the phase terminals.

As an example, the first terminal 110 may be the U-phase terminal, the second terminal 120 may be the neutral terminal, the third terminal 130 may be the V-phase terminal, and the fourth terminal 140 may be the W-phase terminal. According to another exemplary embodiment of the present disclosure, the first terminal may be any one of the other terminals (e.g., the neutral terminal, the V-phase terminal, and the W-phase terminal).

More specifically, the first terminal 110 may include a first body 112 configured to be received in the holder 200, and first terminal parts 114 each extending (bending) from an inner circumferential surface of the first body 112 and protruding upward from the holder 200.

The first body 112 may be variously changed in structure and shape in accordance with required conditions and design specifications. As an example, the first body 112 may have a single-layered structure and may be formed as a band member in the form of a ring (or an arc) having a predetermined diameter.

According to another exemplary embodiment of the present disclosure, the first body may have a double-layered structure (a multilayer structure) having a bent portion.

The first terminal part 114 is connected to the inner circumferential surface of the first body 112 and protrudes upward from the first body 112, and the coil 60 of the stator may be connected to (fused with) the first terminal part 114.

The first terminal part 114 may have various structures to which an end of the coil 60 may be connected, and the present disclosure is not restricted or limited by the structure and the shape of the first terminal part 114.

As an example, the first terminal part 114 may have an approximately 'U'-shaped terminal groove (not illustrated) which may receive the end of the coil 60. The end of the coil 60 may be integrally connected (electrically connected) to the first terminal part 114 by being welded to the first terminal part 114 in a state in which the end of the coil 60 is fitted into the terminal groove.

In addition, the first terminal 110 may include a first power terminal part 116 protruding from an outer circumferential surface of the first body 112.

The first power terminal part 116 is disposed to extend from the outer circumferential surface of the first body 112 and protrudes from an outer circumferential surface of the holder 200. An external power cable having a phase (e.g., the U phase) corresponding to the phase of the first power terminal part 116 may be electrically connected to the first power terminal part 116.

The second terminal 120 is provided to be spaced apart from the first terminal 110 in the first direction.

As an example, the second terminal 120 may be provided to be spaced apart from the first terminal 110 in a horizontal direction (the first direction) corresponding to a radial direction of the first terminal 110.

In the exemplary embodiment of the present disclosure, an example in which the radial direction of the first terminal 110 is directed in the horizontal direction and the horizontal direction is defined as the first direction has been described. However, according to another exemplary embodiment of the present disclosure, the vertical direction or another direction may be defined as the first direction.

More specifically, the second terminal 120 may include a second body 122 configured to be received in the holder 200, and second terminal parts 124 each extending (bending) from an outer circumferential surface of the second body 122 and protruding upward from the holder 200.

The second body 122 may be variously changed in structure and shape in accordance with required conditions and design specifications. As an example, the second body 122 may have a single-layered structure and may be formed as a band member in the form of a ring (or an arc) having a smaller diameter than the first body 112.

According to another exemplary embodiment of the present disclosure, the second body may have a double-layered layer structure (a multilayer structure) having a bent portion.

The second terminal part 124 is connected to the outer circumferential surface of the second body 122 and protrudes upward from the second body 122, and the coil 60 of the stator may be connected to (fused with) the second terminal part 124.

The second terminal part 124 may have various structures to which the end of the coil 60 may be connected, and the present disclosure is not restricted or limited by the structure and the shape of the second terminal part 124.

As an example, the second terminal part 124 may have an approximately 'U'-shaped terminal groove (not illustrated) which may receive the end of the coil 60. The end of the coil 60 may be integrally connected (electrically connected) to the second terminal part 124 by being welded to the second terminal part 124 in a state in which the end of the coil 60 is fitted into the terminal groove.

The third terminal 130 is provided to be stacked on the first terminal 110 in the second direction.

In this case, the configuration in which the third terminal 130 is stacked on the first terminal 110 in the second direction is defined as including a configuration in which the third terminal 130 is stacked on an upper or lower portion of the first terminal 110 in the second direction.

As an example, the third terminal 130 may be stacked on the upper portion (based on FIG. 4) of the first terminal 110 in the second direction (e.g., the vertical direction) perpendicular to the first direction (e.g., the horizontal direction).

More specifically, the third terminal 130 may include a third body 132 configured to be received in the holder 200, and third terminal parts 134 each extending (bending) from an inner circumferential surface of the third body 132 and protruding upward from the holder 200.

The third body 132 may be variously changed in structure and shape in accordance with required conditions and design specifications. As an example, the third body 132 may have a single-layered structure and may be formed as a band member in the form of a ring (or an arc) having a predetermined diameter. In particular, the third body 132 may have a diameter corresponding to the diameter of the first body 112.

According to another exemplary embodiment of the present disclosure, the third body may have a double-layered layer structure (a multilayer structure) having a bent portion.

The third terminal part 134 is connected to the inner circumferential surface of the third body 132 and protrudes upward from the third body 132, and the coil 60 of the stator may be connected to (fused with) the third terminal part 134.

The third terminal part 134 may have various structures to which the end of the coil 60 may be connected, and the present disclosure is not restricted or limited by the structure and the shape of the third terminal part 134.

As an example, the third terminal part 134 may have an approximately 'U'-shaped terminal groove (not illustrated) which may receive the end of the coil 60. The end of the coil 60 may be integrally connected (electrically connected) to the third terminal part 134 by being welded to the third terminal part 134 in a state in which the end of the coil 60 is fitted into the terminal groove.

In addition, the third terminal 130 may include a third power terminal part 136 protruding from an outer circumferential surface of the third body 132.

The third power terminal part 136 is disposed to extend from the outer circumferential surface of the third body 132 and protrudes from the outer circumferential surface of the holder 200. An external power cable having a phase (e.g., the V phase) corresponding to the phase of the third power terminal part 136 may be electrically connected to the third power terminal part 136.

The fourth terminal 140 is provided to be stacked on the second terminal 120 in the second direction.

In this case, the configuration in which the fourth terminal 140 is stacked on the second terminal 120 in the second direction is defined as including a configuration in which the fourth terminal 140 is stacked on an upper or lower portion of the second terminal 120 in the second direction.

As an example, the fourth terminal 140 may be stacked on the upper portion (based on FIG. 4) of the second terminal 120 in the second direction (e.g., the vertical direction) perpendicular to the first direction (e.g., the horizontal direction).

More specifically, the fourth terminal 140 may include a fourth body 142 configured to be received in the holder 200, and fourth terminal parts 144 each extending (bending) from an outer circumferential surface of the fourth body 142 and protruding upward from the holder 200.

The fourth body 142 may be variously changed in structure and shape in accordance with required conditions and design specifications. As an example, the fourth body 142 may have a single-layered structure and may be formed as a band member in the form of a ring (or an arc) having a predetermined diameter. In particular, the fourth body 142 may have a diameter corresponding to the diameter of the second body 122.

According to another exemplary embodiment of the present disclosure, the fourth body may have a double-layered structure (a multilayer structure) having a bent portion.

The fourth terminal part 144 is connected to the outer circumferential surface of the fourth body 142 and protrudes upward from the fourth body 142, and the coil 60 of the stator may be connected to (fused with) the fourth terminal part 144.

The fourth terminal part 144 may have various structures to which the end of the coil 60 may be connected, and the present disclosure is not restricted or limited by the structure and the shape of the fourth terminal part 144.

As an example, the fourth terminal part 144 may have an approximately 'U'-shaped terminal groove (not illustrated) which may receive the end of the coil 60. The end of the coil 60 may be integrally connected (electrically connected) to the fourth terminal part 144 by being welded to the fourth terminal part 144 in a state in which the end of the coil 60 is fitted into the terminal groove.

In addition, the fourth terminal 140 may include a fourth power terminal part 146 protruding from an outer circumferential surface of the fourth body 142.

The fourth power terminal part 146 is disposed to extend from the outer circumferential surface of the fourth body 142 and protrudes from the outer circumferential surface of the holder 200. An external power cable having a phase (e.g., the W phase) corresponding to the phase of the fourth power terminal part 146 may be electrically connected to the fourth power terminal part 146.

As described above, according to the exemplary embodiment of the present disclosure, the first terminal 110 and the second terminal 120 are arranged in the first direction, and the third terminal 130 and the fourth terminal 140 are arranged on the upper portion of the first terminal 110 and the upper portion of the second terminal 120 in the second direction perpendicular to the first direction. In other words, the first to fourth terminals 110, 120, 130, and 140 are arranged in a 2×2 matrix. As a result, it is possible to minimize a thickness of the busbar unit 10.

Therefore, it is possible to obtain an advantageous effect of improving spatial utilization in a region above the stator in which the busbar unit 10 is disposed, improving a degree of design freedom, minimizing an increase in size of the motor caused by mounting the busbar unit 10 for implementing a control circuit for the motor, and thus contributing to the miniaturization of the motor.

The holder 200 is provided to support the state in which the first to fourth terminals 110, 120, 130, and 140 are disposed, and to electrically insulate the first to fourth terminals 110, 120, 130, and 140.

The holder 200 may be variously changed in material and shape in accordance with required conditions and design specifications, and the present disclosure is not restricted or limited by the material and the shape of the holder 200.

As an example, the holder 200 may be formed to have a hollow ring shape and provided as a molded product (made of an insulating material, for example) formed by injection molding.

According to the exemplary embodiment of the present disclosure, the holder 200 may include an overmolded layer 210 formed to surround the first terminal 110 and the second terminal 120, and an overmolded housing 220 formed to surround the overmolded layer 210, the third terminal 130, and the fourth terminal 140.

Figure 4:
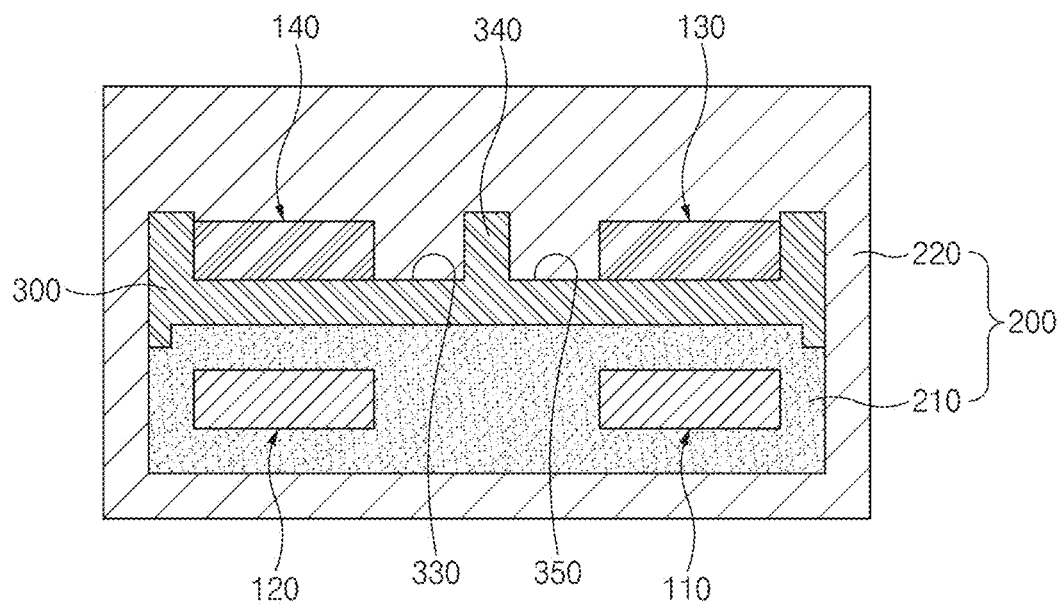
FIG. 4 is a cross-sectional view taken along line 'I-I' in FIG. 3.
Figure 5:
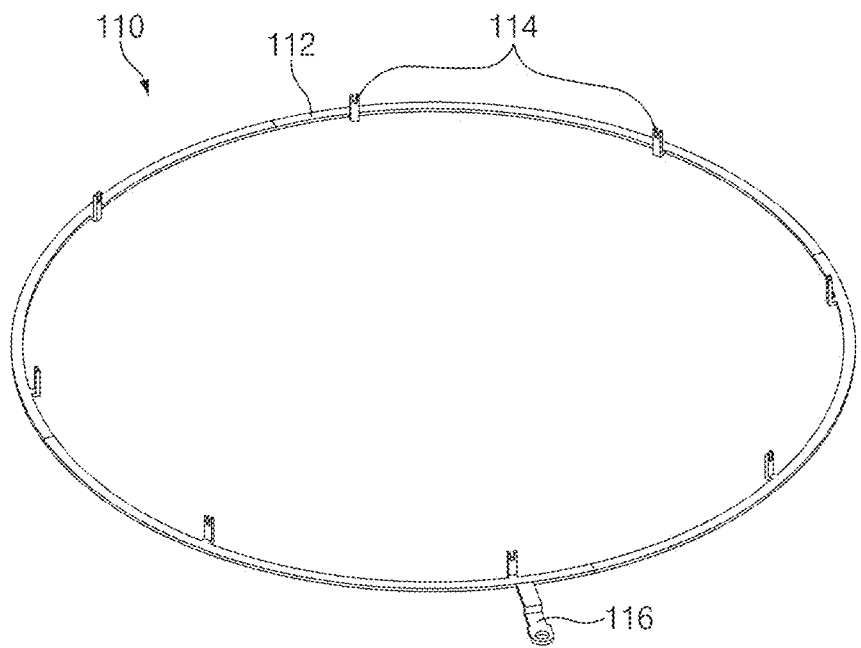
FIG. 5 is a view for explaining a first terminal of the busbar unit for a motor according to the exemplary embodiment of the present disclosure.
Figure 6:
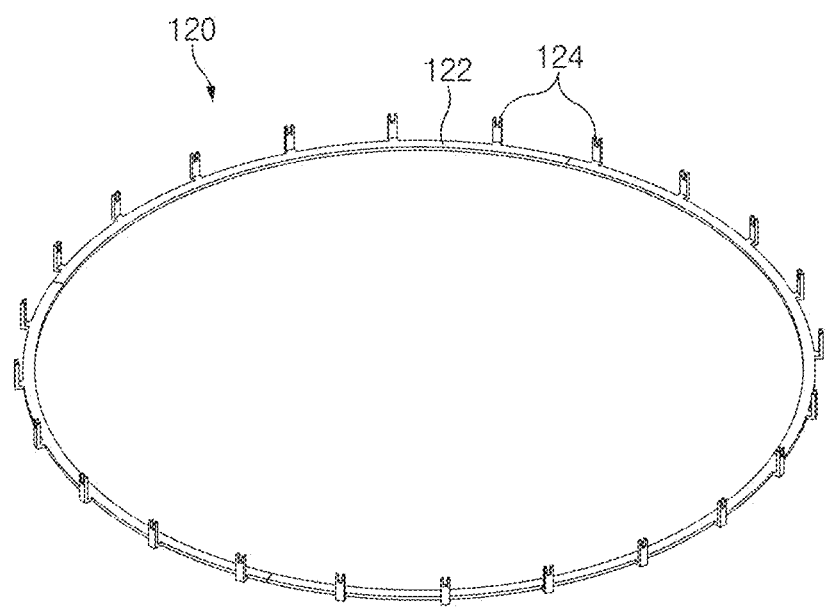
FIG. 6 is a view for explaining a second terminal of the busbar unit for a motor according to the exemplary embodiment of the present disclosure.
Figure 7:
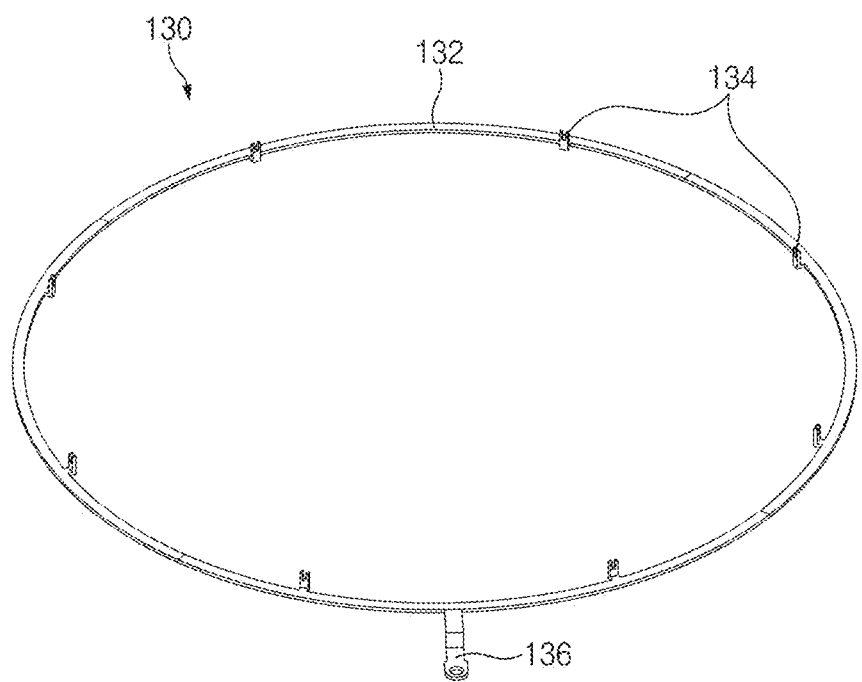
FIG. 7 is a view for explaining a third terminal of the busbar unit for a motor according to the exemplary embodiment of the present disclosure.
Figure 8:
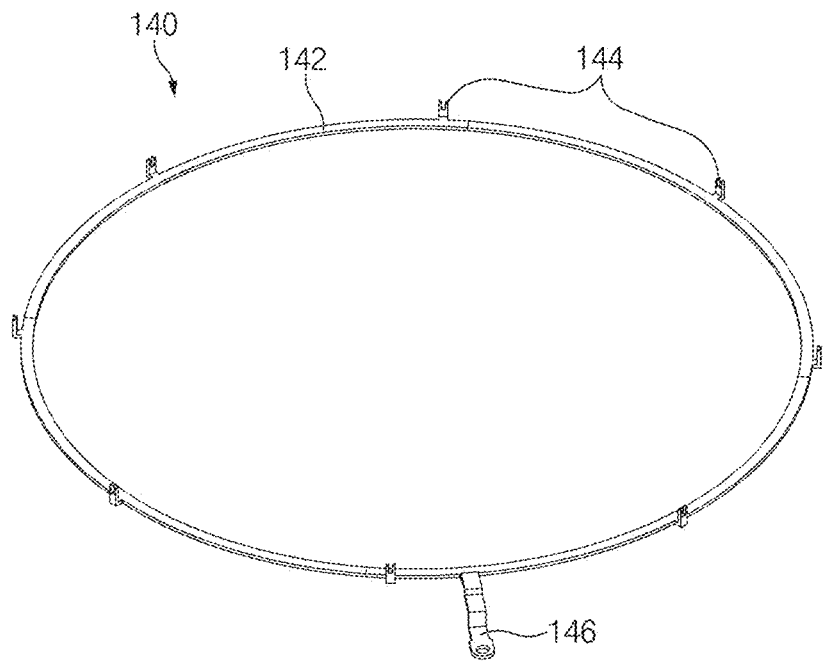
FIG. 8 is a view for explaining a fourth terminal of the busbar unit for a motor according to the exemplary embodiment of the present disclosure.
Figure 9:
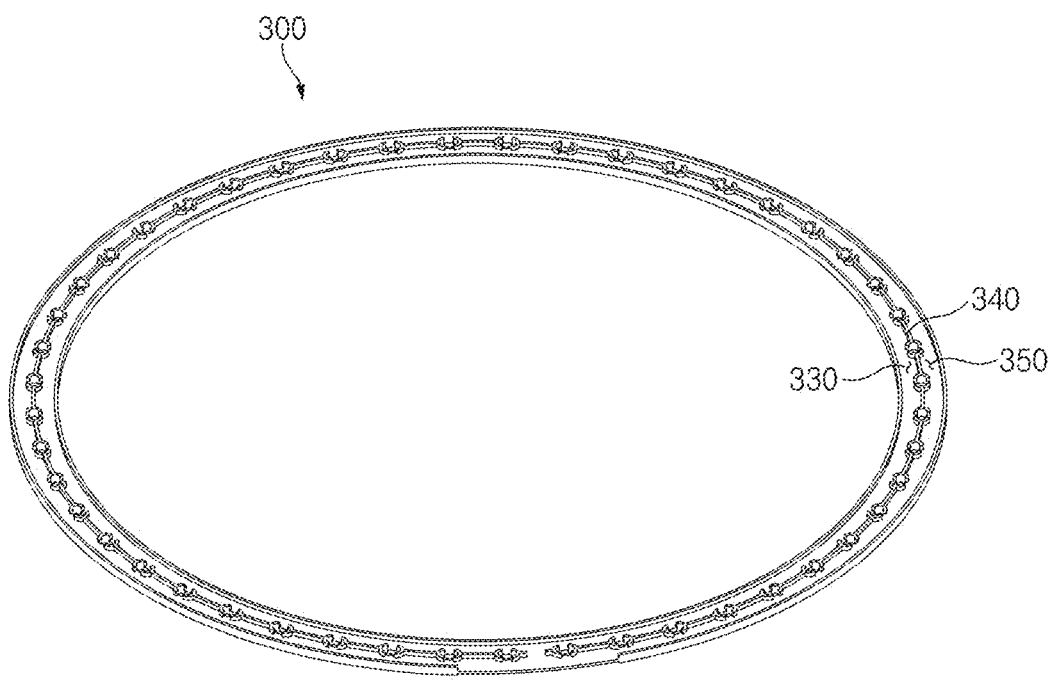
FIG. 9 is a view for explaining a spacer of the busbar unit for a motor according to the exemplary embodiment of the present disclosure.
Figure 10:
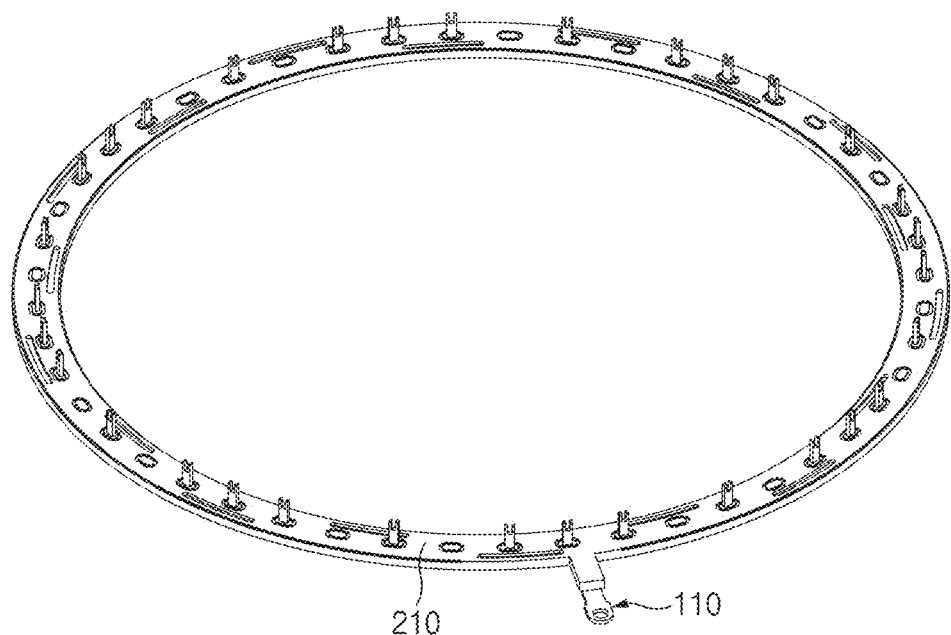
FIG. 10 is a view for explaining an overmolded layer of the busbar unit for a motor according to the exemplary embodiment of the present disclosure.
Figure 11:
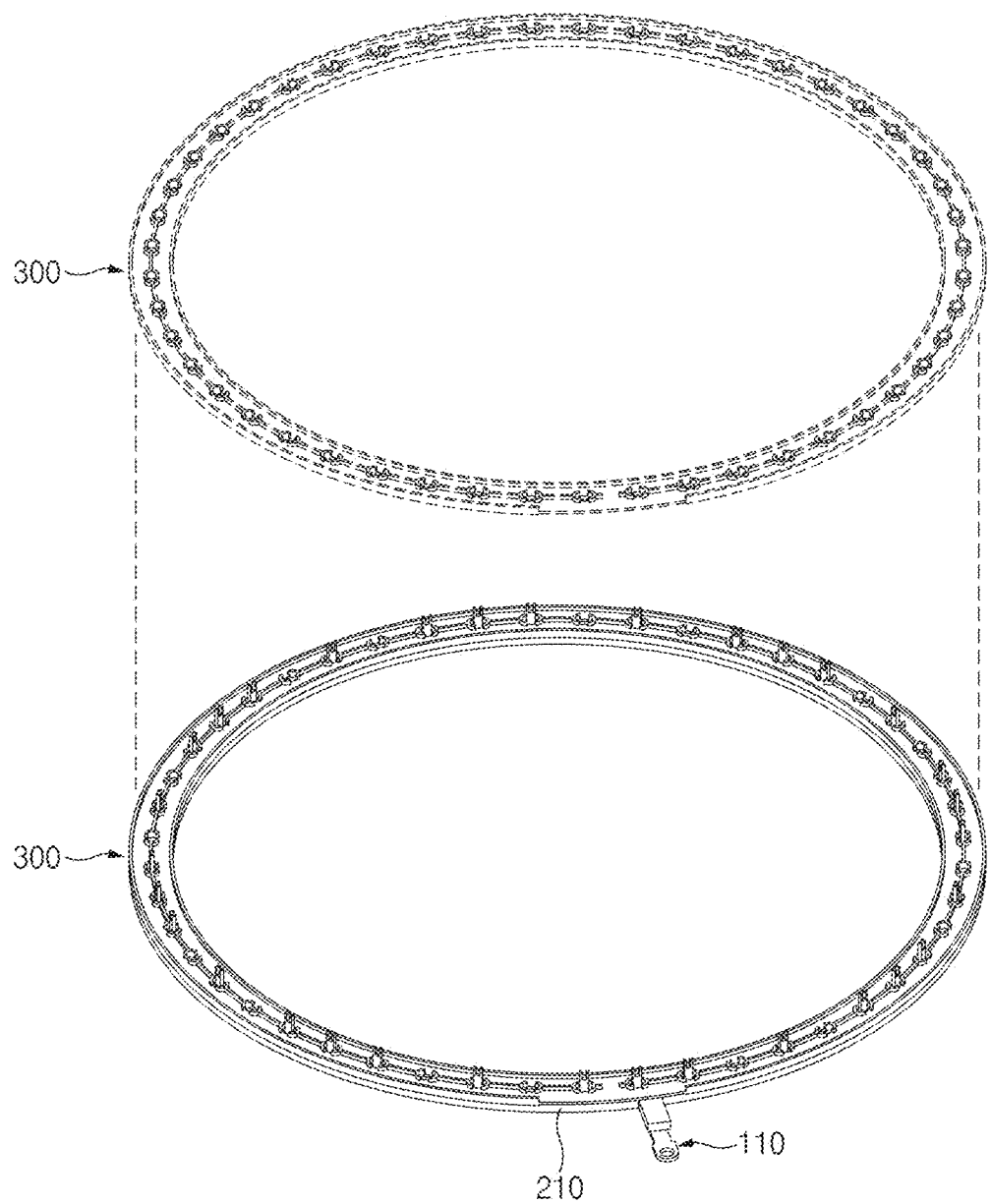
FIG. 11 is a view for explaining a structure in which the spacer of the busbar unit for a motor according to the exemplary embodiment of the present disclosure is disposed.

Referring to FIGS. 4 and 10, the overmolded layer 210 is formed to surround the first and second terminals 110 and 120 arranged in the first direction.

More specifically, the overmolded layer 210 may be injection-molded in the form of a hollow ring that integrally surrounds the first body 112 and the second body 122, and the first terminal part 114 and the second terminal part 124 may be exposed upward from the overmolded layer 210.

Figure 14:
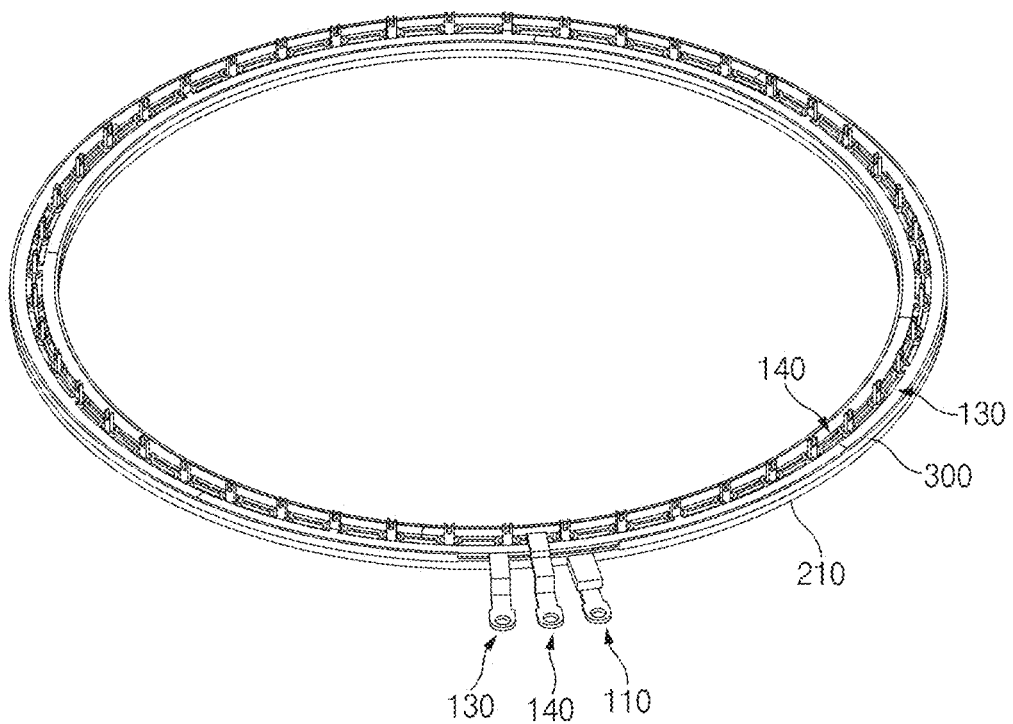
FIG. 14 is a view for explaining the third terminal and the fourth terminal seated on the spacer of the busbar unit for a motor according to the exemplary embodiment of the present disclosure.
Figure 15:
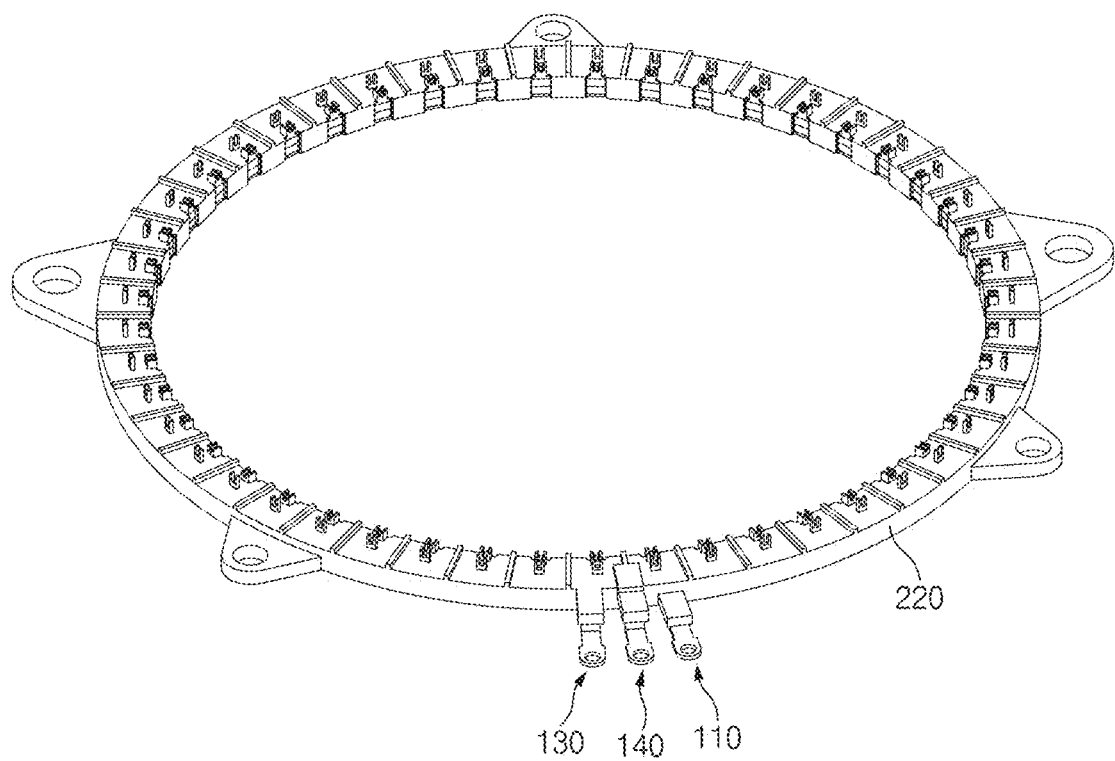
FIG. 15 is a view for explaining an overmolded housing of the busbar unit for a motor according to the exemplary embodiment of the present disclosure.

Referring to FIGS. 4 and 14, the overmolded housing 220 is formed to surround the overmolded layer 210, the third terminal 130, and the fourth terminal 140 in a state in which the third terminal 130 and the fourth terminal 140 are stacked on an upper portion of the overmolded layer 210.

More specifically, the overmolded housing 220 may be injection-molded in the form of a ring that integrally surrounds the overmolded layer 210, the third terminal 130, and the fourth terminal 140. The first terminal part 114, the second terminal part 124, the third terminal part 134, and the fourth terminal part 144 may be exposed upward from the overmolded housing 220.

As described above, in the exemplary embodiment of the present disclosure, since only the single overmolded layer 210 and the single overmolded housing 220 constitute the holder 200, it is possible to obtain an advantageous effect of simplifying the structure of the holder 200, simplifying a process of manufacturing the holder 200, and reducing manufacturing time.

That is, in the related art, an overmolded layer for electrical insulation needs to be individually formed on each of the four terminals (the overmolded layer needs to be formed to surround each of the terminals), and an overmolded housing needs to be additionally formed to surround the entire circumferences of the plurality of overmolded layers stacked in the vertical direction. As a result, there is a problem in that the manufacturing process is complicated and cumbersome. Moreover, in the related art, since an overall height of the busbar is increased as a thickness of the overmolded layer is increased, there is a problem in that it is difficult to ensure a sufficient thickness of the overmolded layer.

However, according to the exemplary embodiment of the present disclosure, the holder 200 may be formed only by the two injection molding processes (the process of injection-molding the overmolded layer and the process of injection-molding the overmolded housing), and as a result, it is possible to obtain an advantageous effect of ensuring electrical insulation performance, simplifying the structure of the holder 200, and simplifying the process of manufacturing the holder 200.

Referring to FIGS. 4, 9, and 11 to 13, the busbar unit 10 for a motor according to the exemplary embodiment of the present disclosure may include a spacer 300 interposed between the first and second terminals 110 and 120 and the third and fourth terminals 130 and 140.

The spacer 300 is provided to ensure a creeping distance for implementing electrical insulation between the first terminal 110 and the third terminal 130 and a creeping distance for implementing electrical insulation between the second terminal 120 and the fourth terminal 140.

That is, since the spacer 300 is interposed between the first and second terminals 110 and 120 arranged in a first layer and the third and fourth terminals 130 and 140 arranged in a second layer, a sufficient spacing interval may be ensured between the first terminal 110 and the third terminal 130, and a sufficient spacing interval may be ensured between the second terminal 120 and the fourth terminal 140, such that electrical insulation performance between the first terminal 110 and the third terminal 130 and electrical insulation performance between the second terminal 120 and the fourth terminal 140 may be ensured. Therefore, it is possible to obtain an advantageous effect of minimizing a defect of insulation between the first terminal 110 and the third terminal 130 (between the second terminal and the fourth terminal) and improving stability and reliability.

As an example, the spacer 300 may be formed to have a hollow ring shape and provided as a molded product (made of an electrically insulating material, for example) formed by injection molding.

In particular, the spacer 300 may be interposed between the overmolded layer 210 and the third and fourth terminals 130 and 140.

According to another exemplary embodiment of the present disclosure, the spacer may be provided above the first terminal and the second terminal before the overmolded layer is formed, and then the overmolded layer may be formed to surround the first terminal, the second terminal, and the spacer.

Figure 12:
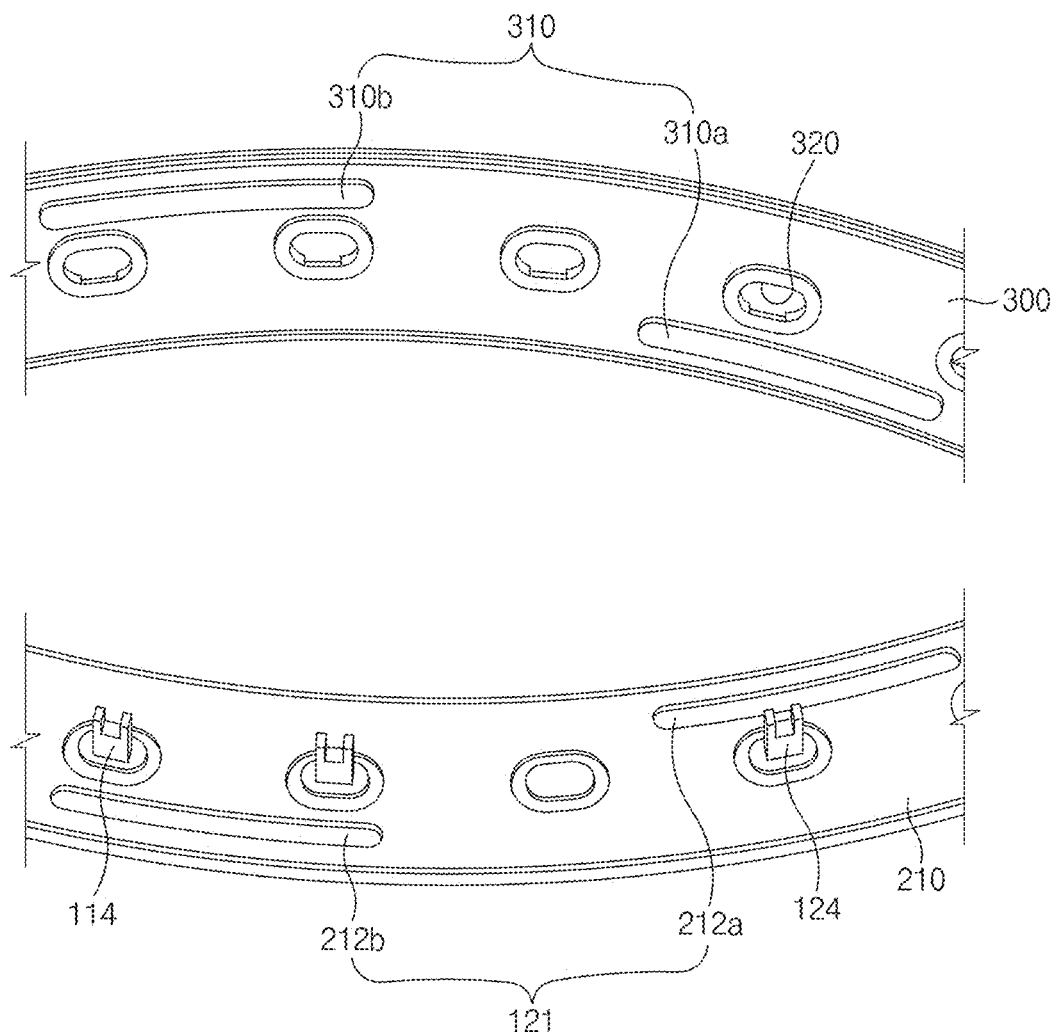
FIGS. 12 and 13 are views for explaining guide protrusions and guide grooves of the busbar unit for a motor according to the exemplary embodiment of the present disclosure.
Figure 13:
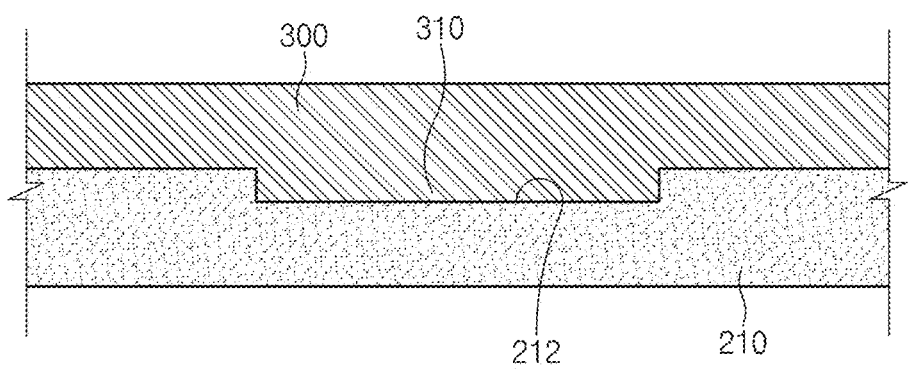

Referring to FIGS. 12 and 13, the busbar unit 10 for a motor according to the exemplary embodiment of the present disclosure may include guide protrusions 310 formed on a bottom surface of the spacer 300 that faces an upper surface of the overmolded layer 210, and guide grooves 212 formed in the upper surface of the overmolded layer 210 and configured to receive the guide protrusions 310.

The guide protrusions 310 and the guide grooves 212 may have various structures in accordance with required conditions and design specifications, and the present disclosure is not restricted or limited by the structure and the number of guide protrusions 310 and guide grooves 212.

According to another exemplary embodiment of the present disclosure, the guide groove may be formed in the spacer, and the guide protrusion may be formed on the overmolded layer.

As described above, when the spacer 300 is seated on the overmolded layer 210, the guide protrusion 310 is received (inserted) into the guide groove 212, and as a result, it is possible to obtain an advantageous effect of preventing the spacer 300 from rotating and moving with respect to the overmolded layer 210 and stably maintaining the state in which the spacer 300 is disposed.

In addition, since the guide protrusion 310 is formed on the spacer 300 and the guide groove 212 is formed in the overmolded layer 210, the spacer 300 may be seated on (in close contact with) the upper portion of the overmolded layer 210 only in a state in which the spacer 300 is aligned (in the vertical direction) in position with the overmolded layer 210, such that it is possible to improve accuracy in assembling the spacer 300 and easily recognize whether the spacer 300 is erroneously assembled.

In particular, the guide protrusions 310 may include first guide protrusions 310a formed adjacent to an inner circumferential surface of the spacer 300, and second guide protrusions 310b spaced apart from the first guide protrusions 310a in a circumferential direction of the spacer 300 and formed adjacent to an outer circumferential surface of the spacer 300. The guide grooves 212 may include first guide grooves 212a configured to receive the first guide protrusions 310a, and second guide grooves 212b configured to receive the second guide protrusions 310b.

As described above, since the first guide protrusion 310a and the second guide protrusion 310b, which are spaced apart from each other, are received in the first guide groove 212a and the second guide groove 212b, it is possible to obtain an advantageous effect of more effectively preventing the spacer 300 from rotating and moving with respect to the overmolded layer 210.

According to the exemplary embodiment of the present disclosure, the spacer 300 may have passing holes 320 through which the first and second terminal parts 114 and 124 exposed (protruding) upward from the overmolded layer 210 may pass, such that the first and second terminal parts 114 and 124 may be exposed upward from the spacer 300 through the passing holes 320 in the state in which the spacer 300 is seated on the upper portion of the overmolded layer 210.

Referring to FIGS. 4 and 14, the spacer 300 according to the exemplary embodiment of the present disclosure may include a first seating portion 350 on which the third terminal 130 is seated, and a second seating portion 330 on which the fourth terminal 140 is seated.

The first and second seating portions 350 and 330 may have various structures capable of stably maintaining the state in which the third and fourth terminals 130 and 140 are seated, and the present disclosure is not restricted or limited by the shapes and the structures of the first and second seating portions 350 and 330.

As an example, the first seating portion 350 and the second seating portion 330 may be recessed in an upper surface of the spacer 300.

According to another exemplary embodiment of the present disclosure, the first seating portion and the second seating portion may protrude from the upper surface of the spacer, or only any one of the first seating portion and the second seating portion may be recessed in or protrude from the upper surface of the spacer.

In particular, a boundary rib 340 may be provided between the first seating portion 350 and the second seating portion 330. As an example, the boundary rib 340 may be formed in the form of a ring continuously formed along a boundary between the first seating portion 350 and the second seating portion 330.

As described above, since the boundary rib 340 is formed along the boundary between the first seating portion 350 and the second seating portion 330, it is possible to obtain an advantageous effect of more stably maintaining the state in which the third and fourth terminals 130 and 140 are seated on the first and second seating portions 350 and 330 and ensuring electrical insulation performance between the third terminal 130 and the fourth terminal 140.

Figure 16:
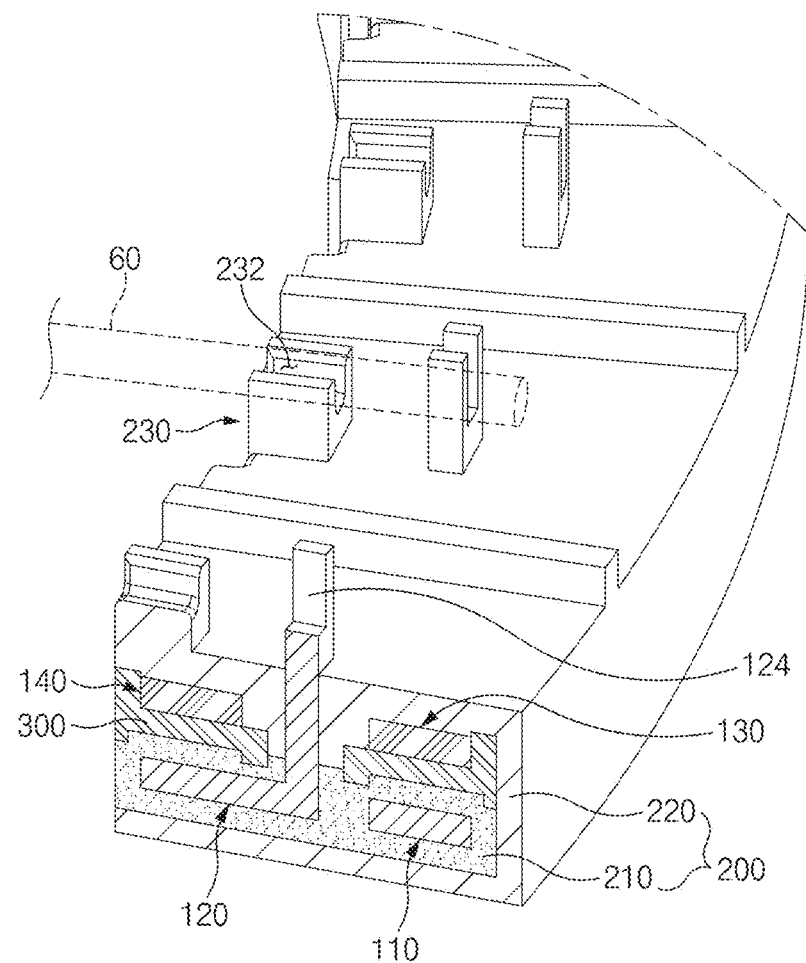
FIG. 16 is a view for explaining coil support units of the busbar unit for a motor according to the exemplary embodiment of the present disclosure.

Meanwhile, referring to FIG. 16, the busbar unit 10 for a motor according to the exemplary embodiment of the present disclosure may include coil support units 230 provided on the upper portion of the holder 200 to support the coil 60 of the stator.

The coil support unit 230 is provided to support the coil 60 in an accurate direction and at an accurate angle when forming the end of the coil 60 wound around the stator toward the first terminal part 114 (the second terminal part, the third terminal part, or the fourth terminal part) (when forming the end of the coil 60 in the radial direction of the stator).

The coil support unit 230 may have various structures capable of supporting the coil 60 of the stator, and the present disclosure is not restricted or limited by the shape and the structure of the coil support unit 230.

As an example, the coil support unit 230 may have a coil receiving groove 232 which receives the coil 60.

In particular, the coil support unit 230 is formed to correspond to the first terminal part 114 (the second terminal part, the third terminal part, or the fourth terminal part) in the radial direction of the first body 112.

In this case, the configuration in which the coil support unit 230 is formed to correspond to the first terminal part 114 in the radial direction of the first body 112 means that the coil support unit 230 and the first terminal part 114 are disposed on approximately the same line in the radial direction of the first body 112.

As described above, since the coil support unit 230 is provided to correspond to the first terminal part 114 in the radial direction of the first body 112, it is possible to obtain an advantageous effect of more accurately guiding and supporting the end of the coil 60 on the first terminal part 114.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

According to the exemplary embodiment of the present disclosure as described above, it is possible to obtain an advantageous effect of simplifying a structure and improving a degree of design freedom and spatial utilization.

In particular, according to the exemplary embodiment of the present disclosure, it is possible to obtain an advantageous effect of minimizing a thickness of the busbar unit and contributing to the miniaturization of the motor.

In addition, according to the exemplary embodiment of the present disclosure, it is possible to obtain an advantageous effect of simplifying a manufacturing process and reducing manufacturing time.

In addition, according to the exemplary embodiment of the present disclosure, it is possible to obtain an advantageous effect of improving electrical insulation performance and improving stability and reliability.

What is claimed is:

1. A busbar unit for a motor, the busbar unit comprising:
a first terminal;
a second terminal provided to be spaced apart from the first terminal in a first direction;

a third terminal stacked on the first terminal in a second direction perpendicular to the first direction;
a fourth terminal stacked on the second terminal in the second direction;
a holder configured to support the first terminal, the second terminal, the third terminal, and the fourth terminal;
the holder comprising an overmolded layer formed to surround the first terminal and the second terminal; and
a spacer interposed between the overmolded layer and the third and fourth terminals.

2. The busbar unit of claim 1, wherein the holder further comprises:
an overmolded housing formed to surround the overmolded layer, the third terminal, and the fourth terminal.

3. The busbar unit of claim 2, comprising:
the spacer is interposed between the first and second terminals and the third and fourth terminals.

4. The busbar unit of claim 1, comprising:
guide protrusions formed on the spacer; and
guide grooves formed in the overmolded layer to receive the guide protrusions.

5. The busbar unit of claim 4, wherein the guide protrusions comprise:
a first guide protrusion formed adjacent to an inner circumferential surface of the spacer; and
a second guide protrusion spaced apart from the first guide protrusion in a circumferential direction of the spacer and formed adjacent to an outer circumferential surface of the spacer, and
wherein the guide grooves comprise:
a first guide groove configured to receive the first guide protrusion; and
a second guide groove configured to receive the second guide protrusion.

6. The busbar unit of claim 3, wherein the spacer is made of an electrically insulating material.

7. A busbar unit for a motor, the busbar unit comprising:
a first terminal;
a second terminal provided to be spaced apart from the first terminal in a first direction;
a third terminal stacked on the first terminal in a second direction perpendicular to the first direction;
a fourth terminal stacked on the second terminal in the second direction;
a holder configured to support the first terminal, the second terminal, the third terminal, and the fourth terminal;
a spacer interposed between the first and second terminals and the third and fourth terminals;
a first seating portion provided on the spacer so that the third terminal is seated on the first seating portion; and
a second seating portion provided on the spacer so that the fourth terminal is seated on the second seating portion.

8. The busbar unit of claim 7, wherein at least one of the first seating portion and the second seating portion is recessed in an upper surface of the spacer.

9. The busbar unit of claim 7, wherein a boundary rib is provided between the first seating portion and the second seating portion.

10. The busbar unit of claim 3, wherein the first terminal comprises:
a first body; and
a first terminal part extending from the first body and exposed from an upper surface of the holder,
wherein the second terminal comprises:
a second body; and
a second terminal part extending from the second body and exposed from the upper surface of the holder,
wherein the third terminal comprises:
a third body; and
a third terminal part extending from the third body and exposed from the upper surface of the holder, and
wherein the fourth terminal comprises:
a fourth body; and
a fourth terminal part extending from the fourth body and exposed from the upper surface of the holder.

11. The busbar unit of claim 10, wherein the spacer has passing holes through which the first terminal part and the second terminal part pass.

12. The busbar unit of claim 1, comprising:
a coil support unit provided on an upper portion of the holder and configured to support a coil of a stator.

13. The busbar unit of claim 12, wherein the coil support unit has a coil receiving groove that receives the coil.

14. The busbar unit of claim 1, wherein the second terminal is provided to be spaced apart from the first terminal in a horizontal direction, the third terminal is stacked on an upper portion of the first terminal in a vertical direction, and the fourth terminal is stacked on an upper portion of the second terminal in the vertical direction.

* * * * *